United States Patent [19]
Hooker

[11] 3,791,205
[45] Feb. 12, 1974

[54] POTTED STRAIN GAUGE

[76] Inventor: Douglas B. Hooker, 924 Wheaton, Kalamazoo, Mich. 49008

[22] Filed: Feb. 4, 1972

[21] Appl. No.: 223,479

[52] U.S. Cl. .............................. 73/88.5 R, 338/6
[51] Int. Cl. ............................................ G01b 7/18
[58] Field of Search ....... 73/88.5 R, 88.5 SD; 338/2, 338/5, 6, 114

[56]  References Cited
UNITED STATES PATENTS

| | | | |
|---|---|---|---|
| 2,322,319 | 6/1943 | Ruge | 73/88.5 R |
| 3,033,034 | 5/1962 | Ziggel | 73/141 A |
| 3,621,437 | 11/1971 | Mading | 73/88.5 R |
| 2,568,940 | 9/1951 | Wolf | 73/88.5 R |
| 2,958,221 | 11/1960 | Bryant | 73/88.5 R |
| 3,092,993 | 6/1963 | Russell | 73/88.5 R |

FOREIGN PATENTS OR APPLICATIONS

| | | | |
|---|---|---|---|
| 813,303 | 5/1959 | Great Britain | 73/88.5 R |

*Primary Examiner*—Charles A. Ruehl
*Attorney, Agent, or Firm*—Woodhams, Blanchard & Flynn

[57] ABSTRACT

A strain gauge construction for removable attachment to a test piece which includes one or more electrical strain gauge elements located intermediate the ends of, and encapsulated in, an elongate protective member. The protective member is preferably contoured to the surface of the test piece to be monitored. Abrasive gripping elements located remotely from the strain gauge element are interposed between the ends of the protective member and the surface of the test piece. A clamp is provided opposite each abrasive gripping element for fixing the ends of the protective member to the test piece, whereby a change in the axial dimension of the test piece results in a corresponding change in the length of the protective member and in the output of the strain gauge elements. In a modified embodiment, the change in length of the protective member is substantially concentrated in the zone occupied by the strain gauge elements for multiplying the output of the strain gauge construction.

13 Claims, 6 Drawing Figures

PATENTED FEB 12 1974 3,791,205
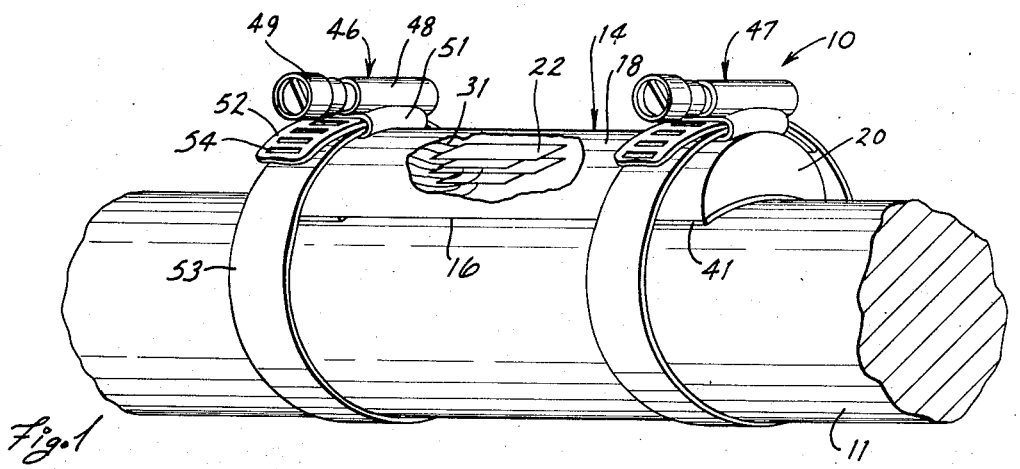
Fig. 1
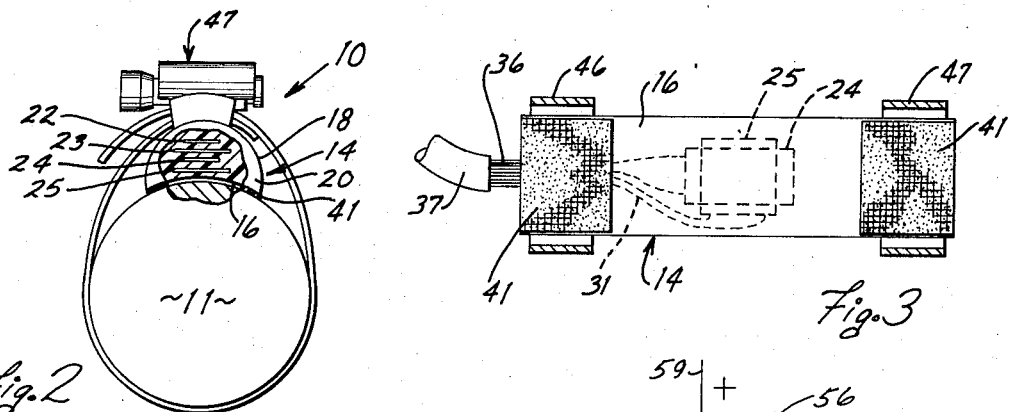
Fig. 2
Fig. 3
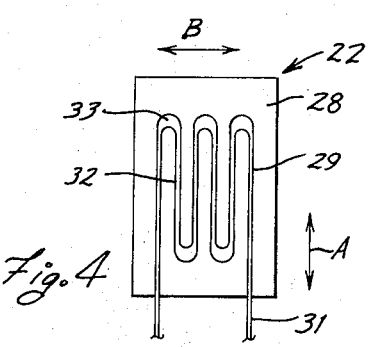
Fig. 4
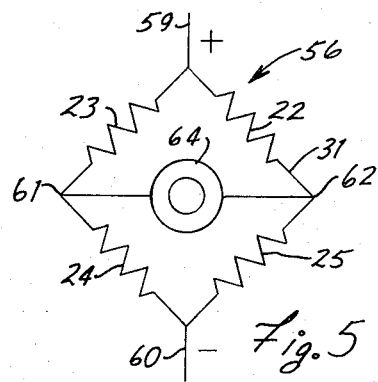
Fig. 5
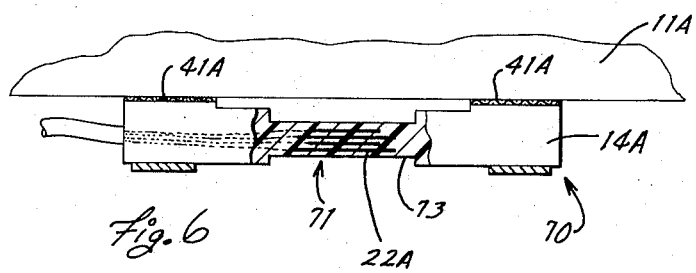
Fig. 6

POTTED STRAIN GAUGE

FIELD OF THE INVENTION

This invention relates to a strain gauge construction and more particularly relates to a removable and reusable strain gauge construction.

BACKGROUND OF THE INVENTION

The present invention was developed in connection with problems arising in the operation of tableting machines in the pharmaceutical industry. Although it is contemplated that the present invention is applicable to other uses, for illustration same will be discussed hereinbelow primarily in terms of the use above described.

In such tableting machines, an example being shown in U.S. Pat. No. 3,255,716 assigned to the assignee of the present invention, the amount of powdered medicament forming each tablet should be maintained within close tolerances. Although spot weighings can be made during a production run, it is economically unfeasible to weigh each tablet produced. On the other hand, it is desirable to have an indication of deviations from tolerance of individual tablets produced during the run, preferably as such tablet is made, so that any necessary machine adjustments can be made immediately. It has been found that the pressure applied to the powdered medicament to form a tablet indicates the amount of medicament in such tablet. Members of the tableting machine connecting the halves of the tablet compression mold undergo strain during tablet making reflecting the pressure applied to the tablet.

Such tableting machines cycle rapidly, compressing the powder charges and releasing the resulting tablets, in an alternating fashion.

Prior attempts to use the above-discussed phenomena by applying commercial piezo or resistance wire strain gauge wafers directly to the alternatingly strained members, which may be termed test pieces, of the tableting machine have not been satisfactory or a number of reasons. One approach used in direct application of strain gauges to the strained member or test piece involved in adhesive, more particularly a form of contact cement. The installation procedure involved a kind of rolling action in applying the opposed cemented surface of the wafer to the cemented surface of the test piece. Installation is very delicate and has been found to be most difficult for individuals to master. Even when extreme care and skill are used, the gauge frequently will not work properly when so cemented to the test piece, for example, by reason of an air bubble or the like entrapped between the gauge element and test piece. However, once the cement has been applied to the gauge element and same has been at least partially adhered to the test piece, the gauge element cannot thereafter be removed and reused since attempts to remove same will normally destroy the gauge element for further use.

The member of the machine to receive the test piece must be removed from the tableting machine to accomplish installation of the strain gauge in the manner above described and such normally results in a 2 day period of down time for the machine. When strain gauge elements are installed in the above manner on members of the tableting machine, it cannot be reliably determined whether the gauge is working properly until after the member or test piece has been installed on the machine and the machine is operated. Further, each such machine normally has a plurality of test pieces, each associated with one of a plurality of mold stations. As a result, incorrect installation of a gauge results not only in the expense of a replacement gauge but also in substantial labor costs associated with disassembly of the machine, installation of another gauge and reassembly of the machine as well as the cost associated with lost production during the down time of an expensive tableting machine.

In addition, such tableting machines provide a very harsh operating environment for gauges of this type. For example, the gauge may, and frequently does, come into contact with drug compounds to be tableted, oil and other substances applied to the machine to insure proper operation thereof. In addition, the machine is frequently cleaned, for example, once a day, utilizing steam and/or a solvent cleaner and water which contact the gauge elements and affect the gauge element or the adhesive bonding same to the test piece resulting in eventual loosening of the gauge element or other damage thereto and hence in the necessity for replacing same.

Prior attempts to apply strain gauges to test pieces of a more general nature, by use of devices other than adhesives, and to protect same by potting and so forth, have not been completely successful and none have been found satisfactory for the particular application giving rise to the present invention, namely, for use on a drug tableting machine, for example, by reason of the complexity of the machine and the close interspacing of parts which prevents use of bulky strain gauge mounting arrangements.

In addition, it has been found, at least in certain instances, such as the above-mentioned tableting machine, that relatively sensitive, or high specific output, strain gauge elements are required to provide adequate reading for control purposes. This in the past has required use of expensive high sensitivity strain elements costing, for example, from fifty to one hundred dollars apiece, less expensive strain elements providing inadequate sensitivity.

Accordingly, the objects and purposes of this invention include provision of:

1. A strain gauge construction which can be quickly and readily affixed to a test piece without the use of adhesives.

2. A construction, as aforesaid, which can be removed from the test piece without damage thereto and thereafter reused on the same or other test pieces for a number of times.

3. A construction, as aforesaid, which is relatively compact, which can be properly installed on a test piece in a machine when the test piece is closely surrounded by other parts of the machine without interfering with machine operation.

4. A construction, as aforesaid, which is adapted to include one or a number of individual strain elements firmly held in a desired location and orientation with respect to each other irrespective of whether or not the strain gauge construction is installed on the test piece and in which the strain gauge elements are protected against damage by environmental steam, oil, drug or other compounds, solvents, cleaners, water and so forth and in which protection against excessive heat is also provided.

5. A construction, as aforesaid, in which the effective securement of the strain gauge construction to test piece is independent of and unaffected by environmental hazards such as those above-described.

6. A construction, as aforesaid, in which installation of the test piece may be carried out by persons without special training or skills.

7. A construction, as aforesaid, in which successful installation on the test piece is predictable with a high degree of reliability.

8. A construction, as aforesaid, capable of giving substantial sensitivity using relatively low sensitivity, inexpensive strain gauge elements and which is capable of multiplying the strain indicating output of such strain gauge elements.

9. A construction, a aforesaid, which is readily and inexpensively manufacturable at low cost in large or small quantities and which is capable of long service life without attention under harsh conditions.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a partially broken, fragmentary, pictorial view of a strain gauge construction embodying the invention secured to a test piece.

FIG. 2 is a partially broken end view of the apparatus of FIG. 1.

FIG. 3 is a fragmentary bottom view of a portion of the apparatus of FIG. 2.

FIG. 4 is a top view of a strain gauge element usable in the apparatus of FIG. 1.

FIG. 5 is a simplified electrical schematic of the electrical connections of the strain gauge elements of the apparatus of FIG. 1.

FIG. 6 is a partially broken, side elevational view of a modified strain gauge construction embodying the invention.

SUMMARY OF THE INVENTION

The objects and purposes of the invention are met by providing a strain gauge construction for removable attachment to a test piece which includes one or more electrical strain gauge elements located intermediate the ends of, and encapsulated in, an elongate protective member. The protective member is preferably contoured to the surface of the test piece to be monitored. Abrasive elements located remotely from the strain gauge element are interposed between the ends of the protective member and the surface of the test piece. A clamp is provided opposite each abrasive gripping element for fixing the ends of the protective member to the test piece, whereby a change in the axial dimension of the test piece results in a corresponding change in the length of the protective member and in the output of the strain gauge elements. In a modified embodiment, the change in length of the protective member is substantially concentrated in the zone occupied by the strain gauge elements for multiplying the output of the strain gauge construction.

DETAILED DESCRIPTION

FIG. 1 discloses a strain gauge construction 10 secured in a position of use to a test piece 11 here of circular cross section, which may, for example, be a tableting punch support bolt, or shaft, for a drug tableting machine, as shown in aforementioned Pat. No. 3,255,716.

The construction 10 comprises an elongate, solid protective member 14 (FIGS. 1 and 2) which in the particular embodiment shown is substantially of uniform cross section throughout its length. The protective member 14 has an inner peripheral wall 16 which in cross section preferably conforms to the cross sectional shape of the opposed wall of the test piece 11 and in the embodiment shown is concavely curved. The outer peripheral wall 18 of the protective member 14 is preferably convexly curved, here through more than 180°, to afford a relatively broad area of contact for clamping means hereinafter discussed. The end walls 20 of the member 14 are preferably perpendicular to the inner and outer walls 16 and 18.

The protective member 14 is preferably formed by molding to encapsulate a convenional strain gauge element 22. In the particular embodiment shown, a plurality of strain gauge elements 22–25 are stacked in close spaced relation within the member 14.

Although a variety of types of conventional strain elements can be used, the present invention contemplates use at least in certain instances of relatively inexpensive strain element of the resistance wire variety. An example is illustrated in FIG. 4, and comprises a relatively thin rectangular substrate or encapsulating wafer 28 of resilient flexible material of nonconductive type, on which is fixedly supported, or alternatively in which is embedded or encapsulated, a resistance wire 29. The ends 31 of the wire 29 extend from one end of the wafer, the intermediate portion of the wire being led back and forth parallel to the surface of the wafer to define a series of longitudinally extending wire segments 32, adjacent ones of which are connected by reinforced end portions 33. Such a gauge is sensitive to elongation in the direction indicated by the arrow A, namely in parallelism with the segments 32. By reason of their reinforcement and short length, the end portions are less sensitive to elongation or contraction, hence to strain in the transverse direction indicated by the arrow B.

The strain elements 22–25 are preferably stacked in alternately oriented fashion, as in FIGS. 1–3, for purposes appearing hereinafter. The strain elements are preferably centrally located within the protective member 14, being symetrically located transversely thereof as seen in FIGS. 2 and 3, and preferably are centrally located lengthwise thereof and remote from the ends thereof.

The protective member 14 is of a material which is relatively hard. The member 14 has sufficient resiliency and flexibility to follow elongation and retraction of the test piece 11 and firmly grips the surface of the strain elements to cause a corresponding elongation or contraction thereof. The protective member 14 is preferably of a material which is resistant to, and protects the strain elements from contact with, potentially damaging environmental conditions, such as water, steam, chemicals such as solvents and cleaning agents, drug compounds and so forth. The material of the protective member 14 is also electrically nonconductive to provide electrical isolation between the leads 31 of the various strain elements and between such leads and adjacent conductors located in the neighborhood of the protective member. The material of protective member 14 is preferably also heat insulative. As an example, polyester resin has been found to be a suitable material for the protective member 14.

The leads 31 of the strain elements are preferably led (as indicated in FIG. 3 in phantom) toward the leftward end of the protective member 14 and exit therefrom in close grouping as seen in 36. A suitable sheath 37 may be provided to cover the exiting group 36 of leads. The sheath may terminate adjacent the end of the protective member 14 as shown or may be molded into, or to, the end of the protective member.

The inner wall 16 is provided at each end with abrasive gripping elements 41. The gripping elements 41 preferably extend the full width of the inner wall 16 and extend relatively short distances longitudinally thereof, being well spaced from the central area of the protective member wherein are located the strain elements 22-25. In the preferred embodiment shown, the gripping elements 41 are conventional sand screens, each comprising a screenlike mesh having parallel strands extending in mutually orthogonal directions, which strands have bonded thereto a substantially covering layer of abrasive particles, conventionally carborundum grit. The sandscreens 41 are conveniently secured, as by an adhesive, to the end portions of the inner wall 16, primarily to assist accurate location of the sandscreens with respect to the protective member and to render the combination of the protective member and sandscreens a single unit which is easier to handle during installation on the test piece. The sandscreens are relatively flexible and conform readily to the curved inner wall 16.

With the protective member applied to the surface of the test piece 11 as shown in FIGS. 1 and 2, the sandscreens 41 intervening between the surfaces thereof fulfill two functions. First, the sandscreens space, by a small distance, the portion of the inner protective member wall 16 therebetween from the surface of the test piece 11. Second, when the protective member 14 is pressed against the test piece, the abrasive particles of the sandscreen tend to dig minutely into and become partially embedded in the opposed surfaces of the protective member inner wall 16 and test piece 11 whereby to mechanically interlock both with respect to said screens, and with respect to each other, to prevent relative translatory movement therebetween.

Clamping means, here comprising a pair of conventional band clamps 46 and 47, are provided for fixedly securing the ends of the protective member 16 to the surface of the test piece 11. The clamps 46 and 47 are substantially axially centered with respect to corresponding ones of the sandscreens 41 for tightly pressing the abrasive particles of the sandscreens into the opposed surfaces of the protective member 14 and test piece 11 to tightly hold the ends of the protective member to the test piece. Each of the band clamps comprises a housing 48 (FIG. 1) in which a captive screw 49 is rotatable. The housing 48 includes a lower, generally undercut, channel-shaped or oval portion 51 through which extend end portions 52 of a band 53, such end portions having transverse perforations 54 engageable by threads (not shown) of the captive screw 49 whereby rotation of the screw in one direction moves the band ends 52 past each other to tighten the band 53 around the radially surrounded protective member end portion and segment of the test piece 11.

Although the protective member may encapsulate any desired number of strain elements interconnected as desired, in the preferred embodiment shown the strain elements 22-25 shown have their leads 31 connected, in a manner illustrated schematically in FIG. 5, to form the four elements of a Wheatstone bridge 56. The strain elements 22 and 24, which are longitudinally oriented in the protective member 14, are connected in two opposed legs of the bridge 56 and the transversely oriented strain elements 23 and 25 are connected in the remaining pair of opposed legs of the bridge 56. DC current from a suitable source, such as a battery not shown, is applied through leads 59 and 60 to the connected ends of strain elements 22, 23 and 24, 25, respectively. Output is taken from the opposed remaining corners 61 and 62 of the bridge, across which an output means 64 is connected, such output means existing of, for example, a DC isolating amplifier of conventional type (not shown) driving a readout device such as a conventional AC meter or oscilloscope (not shown) so that the peak to peak amplitude of alternating signal occurring at the bridge outputs 61, 62 will be indicated.

OPERATION

With multiple strain elements located as shown within the protective member 14, prestressing due for example to shrinkage or expansion of the member 14 following molding and during curing, will tend to act equally on all such members. Preferably the material used to make the member 14 is such as to minimize such prestressing.

The protective member 14 containing one or more strain elements, preferably four as shown, is applied to the test piece 11 with the sandscreens 41 intervening radially between the ends of protective member and the opposed surface of the test piece. Band clamps 46 and 47 are applied to encircle the resultant assembly of protective member and test piece, at the ends of the protective member in radial opposition to the sand screens 41. Tightening of the clamp screws 49 causes the circling bands 53 to reduce in circumference to press the ends of the protective member 14 against the sand screens 41 and the latter thence against the opposed surface of the test piece 11 with sufficient force that the abrasive particles on the sandscreen bite into and mechanically interlock with the opposed surfaces of the protective member and test piece. Such completes installation of the strain gauge construction on the test piece.

When so installed, the inner wall 16 of the protective member 14 is normally out of contact, intermediate the sandscreens, with the opposed surface of the test piece.

The securement of the protective member 14 to the test piece is such that any radial compression of the protective member by the clamps takes place in zones well spaced from the location of the strain elements and thereby minimizes any tendency toward stressing same by bending during installation. Normally, there will be no elongation or contraction of the protective member 14 during clamping and thus no change in dimension longitudinally of the protective member by the strain elements. In this sense then the installation of the member 14 on the test piece avoids problems of unpredictable prestressing, associated for example with direct adhesive bonding of strain elements to a test piece.

The test piece 11, when incorporated as above-mentioned in a tableting machine, is normally subjected to periodic compression, though the strain gauge construction 10 is adapted to monitor strain resulting from either compression or tension axially of the test piece. Axial compression of the test piece 11 results in an incremental reduction in its length and a corresponding incremental reduction in the length of the protective member 14 between the sandscreens 41. This in turn results in corresponding length reduction and resistance reduction in the longitudinal strain elements 22 and 24. The transverse elements 23 and 25, on the other hand, are compressed across their width and tend to elongate along their length, that is, transversely of the test piece, whereby the resistance thereof increases although normally to a lesser extent.

The strain elements 22–25 are preferably initially similar in their resistances and normally remain so after encapsulation in the member 14. In this condition, the bridge will normally be balanced when the test piece 11 is unstressed, equal voltages appearing in points 61 and 62 and no output appearing in the output device 64. Prestressing of the elements 22–25 due, for example, to an elongation or contraction of the member 14 during curing may change the resistance values of strain elements 22 and 24 with respect to strain elements 23 and 25 thus resulting in an initial imbalance in the bridge (a DC voltage across points 61 and 62) with the test piece unstressed. This may be eliminated for example by provision of rebalancing potentiometers in bridge links 22 and 24 or 23 and 25. However, such initial DC inbalance is immaterial, particularly if relatively minor, in situations wherein, as in the case of use in a tableting machine, the information of interest is deviation in the peak to peak alternating voltage varying across terminals 61 and 62 during rapid repetitive cycling of the tableting apparatus, that is, rapid cycling of compression and release on the test piece 11. In such instances the device 64 will merely measure peak to peak voltage and ignore the DC zero level. Indeed in such applications, at rest identity of resistance of the various elements 22–25 is not required since the point of interest is not absolute peak to peak voltage but merely the magnitude of changes in peak to peak voltages during the operation of the machine. Thus, given an initial peak to peak voltage reading when the machine is known to be producing tablets of the required weight, later changes in peak to peak voltage indicate a change in tablet weight.

Because of the provision of both transversely extending and longitudinally extending strain elements, and the changes in the fact that changes of resistance occur in both as a result of compression of the test element, the output voltage across points 61 and 62 tends to be larger for a given stress input to the test piece 11 than would be the case utilizing a single strain element so that an incremental multiplication of the sensitivity is present.

Further, provision of four such strain elements in the same protective member and connection of all such elements into a single bridge insures that all bridge elements undergo the same resistance variations as due, for example, to long term ambient temperature shifts so that the resulting construction is essentially insensitive to temperature changes.

MODIFICATION

FIG. 6 discloses a modified construction 70, substantially corresponding to the construction 10 above-described with respect to FIGS. 1–5, except that the zone 71 of the protective member 14A in which the strain elements are located is made more strain sensitive (elongates further in response to a given compressive or tensile force than does the remainder of the protective member 14A).

This effect may be achieved simply by reducing the cross-sectional area of the zone 71, here by providing an axially elongate groove or grooves 73 around part or all of the circumference of the protective member 14A. In this manner, a disproportionally large share of the elongation of the member 14A (corresponding to elongation of the part of the test piece 11A between the mounting elements 41A) takes place in the zone 71. In this manner, most of the absolute change in length of the portion of the test piece 11A between mounting elements 41A is applied to the strain elements 22A, etc. The length of the zone 71 is short compared to the distance between mounting elements 41A, for example, one-fifth such distance and the majority of or substantially all of the length change in th protective member 14A occurs in such zone 71. It will be seen that the output of the strain elements 22A will be in effect multiplied, for example substantially by a factor of 5, with a corresponding multiplication of the voltage appearing across bridge terminals 61 and 62 of FIG. 5, assuming strain elements 22A, etc. to be connected to such a bridge. Thus, substantially less sensitive and less expensive strain elements can be employed in the construction of FIG. 6 for a corresponding output.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A strain gauge construction for removable mounting on a test piece, comprising in combination:
    an elongate protective member alignable with the test piece and having an inner wall configured at least adjacent its ends to the shape of the test piece;
    at least one strain gauge element encapsulated in the material of said protective member and so confined within an intermediate portion thereof;
    abrasive gripping means interposed between said inner wall of said protective member and the opposed surface of said test piece, said abrasive gripping means comprising a pair of abrasive portions located adjacent the ends of said protective member and spaced longitudinally from opposite ends of said strain element;
    clamp means engageable with said test piece and protective member substantially in radial opposition to corresponding ones of said abrasive gripping portions for interlocking the end portions of said protective member and said test piece to said abrasive gripping portions, said abrasive portions being of sufficient thickness to space said intermediate portion of said protective member freely from said test piece whereby axial deformations of the test piece between the abrasive portions results in a corresponding deformation of said protective member between said abrasive portions.

2. The device of claim 1, in which said protective member is externally grooved in a longitudinal segment thereof occupied by said strain gauge element, such externally grooved segment being capable of substantially greater longitudinal deformation per unit longitudinal force input than in the remainder of the length of said protective member between said abrasive gripping means, whereby the majority of longitudinal deformation of the test piece between said abrasive gripping means is transferred to said strain gauge element by said protective member for multiplying the effective output of said strain gauge element.

3. The apparatus of claim 2, in which said groove circumferentially surrounds said segment of said protective member to render same of substantially reduced cross section as compared to the remaining portions of said protective member extending therefrom into contact with said abrasive gripping means.

4. The apparatus of claim 1, in which said abrasive gripping portions each comprise a sandscreen and said sandscreens are collectively of length substantially less than the length of said protective member, said sandscreens comprising a plurality of strandlike elements fixedly carrying abrasive particles, said abrasive particles mechanically interlocking with the opposed surfaces of said protective member inner wall and said test piece to prevent relative axial movement between each end of the protective member and the opposed portion of said test piece.

5. The apparatus of claim 1, in which said elongate protective member comprises a monolithic solid which surrounds said strain gauge element in continuous contacting and stress transmitting relation, said clamp means engaging peripheral surfaces of said protective member and said test piece at locations circumferentially remote from the interface therebetween for pressing each thereof against said abrasive gripping means to effect said interlocking.

6. A strain gauge construction for removable mounting on a test piece, comprising in combination:
an elongate protective member alignable with the test piece and having an inner wall configured at least adjacent its ends to the shape of the test piece;
at least one strain gauge element encapsulated in said protective member and spaced intermediate the ends thereof, said protective member comprising a monolithic solid of relatively hard but resiliently deformable material which encapsulates therewithin said strain gauge element, the material of said protective member being in continuous intimate surface contact with said strain gauge element whereby deformation of the portion of said protective member occupied by said strain gauge element results in a corresponding deformation of said strain gauge element;
abrasive gripping means interposed between said inner wall of said protective member and the opposed surface of said test piece, said abrasive gripping means being located adjacent the ends of said protective member and spaced longitudinally from and on opposite sides of said strain element;
clamp means engageable with said test piece and with said protective member substantially in radial opposition to corresponding ones of said abrasive gripping members for snugly but removably securing said protective member to said test piece in the regions of said abrasive gripping members.

7. The apparatus of claim 6, including a plurality of strain gauge elements stacked in close spaced, substantially parallel relation and centrally located within said protective member, said strain gauge elements being substantially planar, said elements each having an axis along which said strain gauge element is primarily sensitive to elongation and contraction, the axes of adjacent ones of said strain gauge elements being misaligned.

8. The apparatus of claim 7, in which the axes of alternate ones of said strain gauge elements are substantially perpendicular to the axes of the remaining ones of said strain gauge elements, said alternating ones of said strain gauge elements being aligned longitudinally of said elongate protective member, the remaining ones of said strain gauge elements being gripped by the material of said protective member in such manner that a dimensional change thereof transverse to said axes thereof results in an opposite change along the axes thereof whereby an axial dimensional change of said protective member results in a strain indication by said alternate ones of said strain gauge elements and an opposite strain indication from said remaining strain gauge elements.

9. The apparatus of claim 8, in which four such strain gauge elements are provided in stacked relation within said protective member, each of said strain gauge elements having a pair of leads and comprising a resistive element whose resistance varies in response to elongation and contraction of said element along said axis thereof, said output leads of said strain gauge elements being connected to each other for forming a four-element Wheatstone bridge supplied at two opposite corners with operating DC potential and at the remaining opposed corners thereof with a readout device adapted for monitoring cyclical variations in bridge imbalance resulting from corresponding cyclical axial stresses imposed on said test piece.

10. A strain gauge construction for removable mounting on a test piece, comprising in combination:
an elongate protective member alignable with the test piece and having an inner wall configured at least adjacent its ends to the shape of the test piece;
at least one strain gauge element encapsulated in said protective member and spaced intermediate the ends thereof;
abrasive gripping means interposed between said inner wall of protective member and the opposed surface of said test piece and on opposite sides of said strain element, said abrasive gripping means each comprising a sandscreen opposed to the inner wall of said protective member, one such sandscreen being provided at each end of said protective member, said sandscreens being spaced from each other and from said strain gauge element located therebetween, said sandscreens extending substantially the width of said inner wall, said sandscreens being collectively of length substantially less than the length of said protective member, said sandscreens being of thickness sufficient to maintain a portion of said inner wall of said protective member therebetween spaced from the opposed surface of said test piece, said sandscreens comprising a plurality of crossing elongate interconnected strandlike elements fixedly carrying abrasive particles, said abrasive particles being capable of mechanically interlocking the opposed surfaces of said protective member inner wall and said test piece to prevent relative axial movement between each end of the protective member and the opposed portion of said test piece whereby axial deformations of the test piece between the sandscreens result in a corresponding axial deformation of said protective member between said sandscreens;

clamp means engageable with said test piece and with said protective member substantially in radial opposition to corresponding ones of said abrasive gripping members for snugly but removably securing said protective member to said test piece in the regions of said abrasive gripping members.

11. The apparatus of claim 10, wherein said clamp means comprises a pair of tightenable clamp members engageable with the end portions of said protective member and opposed segments of said test piece and releasably tightenable to tightly sandwich said sandscreens between said protective member and said test piece.

12. The apparatus of claim 11, in which said clamp members are located in axially spaced relation from the central zone of said protective member occupied by said strain gauge element and lie in radial opposition to said sandscreen whereby the compressive force of said clamp member is applied radially directly to said sandscreen and the portion of said protective member between said sandscreens is substantially free of such compressive force.

13. A strain gauge construction for removable mounting on a test piece, comprising in combination:

an elongate protective member alignable with the test piece and having an inner wall configured at least adjacent its ends to the shape of the test piece;

at least one strain gauge element encapsulated in said protective member and spaced intermediate the ends thereof;

abrasive gripping means interposed between said inner wall of said protective member and the opposed surface of said test piece, said abrasive gripping means being spaced longitudinally from and on opposite sides of said strain element, said abrasive gripping means comprising sandscreens located on the inner wall of the protective member at the ends thereof and in longitudinally spaced relation to said strain gauge element;

clamp means engageable with said test piece and with said protective member substantially in radial opposition to corresponding ones of said abrasive gripping memebers for snugly but removably securing said protective member to said test piece in the regions of said abrasive gripping members, said clamp means comprising a pair of band clamps located in radial opposition to said sandscreens and circumferentially surrounding said ends of said protective member, said sandscreens and the opposed segments of said test piece compressing said protective member and test piece firmly against the intervening sandscreen whereby the abrasive particles on the sandscreen mechanically interlock the protective member and test piece against relative axial motion.

* * * * *

UNITED STATES PATENT OFFICE
CERTIFICATE OF CORRECTION

Patent No. 3 791 205            Dated February 12, 1974

Inventor(s) Douglas B. Hooker

It is certified that error appears in the above-identified patent and that said Letters Patent are hereby corrected as shown below:

Assigned to The Upjohn Company, Kalamazoo, Michigan

Col. 1, line 41; "or" should be ---for---.

Col. 6, line 41; "member in" should read ---member and in---.

Col. 8, line 25; "th" should be ---the---.

Col. 10, line 51; "of protective" should read ---of said protective---.

Col. 11, line 15; "members" should be ---means---.

Col. 11, line 17; "members" should be ---means---.

Col. 11, line 29; "sandscreen" should be ---sandscreens---.

Col. 11, line 29; "said" should be ---each---.

Col. 11, line 30; "said" should be ---its---.

Col. 12, line 20; "members" should be ---means---.

Col. 12, line 22; "members" should be ---means---.

Col. 12, line 27; "compressing" should read ---for compressing---.

Signed and sealed this 17th day of December 1974.

(SEAL)
Attest:

McCOY M. GIBSON JR.            C. MARSHALL DANN
Attesting Officer               Commissioner of Patents